(12) United States Patent
Bühler et al.

(10) Patent No.: US 9,403,942 B2
(45) Date of Patent: Aug. 2, 2016

(54) TRANSPARENT, AMORPHOUS POLYAMIDE MOULDING COMPOUNDS AND USE THEREOF

(76) Inventors: Friedrich Severin Bühler, Thusis (CH); Ralf Hala, Lindenberg (DE)

( * ) Notice: Subject to any disclaimer, the term of this patent is extended or adjusted under 35 U.S.C. 154(b) by 95 days.

(21) Appl. No.: 12/568,345

(22) Filed: Sep. 28, 2009

(65) Prior Publication Data

US 2010/0144963 A1 Jun. 10, 2010

Related U.S. Application Data

(63) Continuation-in-part of application No. 11/732,537, filed on Apr. 4, 2007, now abandoned.

(30) Foreign Application Priority Data

Apr. 7, 2006 (EP) .................................. 06007399

(51) Int. Cl.
*C08L 77/06* (2006.01)
*C08G 69/26* (2006.01)
*G02B 1/04* (2006.01)

(52) U.S. Cl.
CPC .............. *C08G 69/26* (2013.01); *C08G 69/265* (2013.01); *G02B 1/04* (2013.01)

(58) Field of Classification Search
CPC ................................ C08G 69/26; C08L 77/06

USPC ........................................................... 524/606
See application file for complete search history.

(56) References Cited

U.S. PATENT DOCUMENTS

| | | | |
|---|---|---|---|
| 3,839,299 A | 10/1974 | Campbell et al. | |
| 4,207,411 A * | 6/1980 | Shue ............................. | 528/338 |
| 5,696,202 A * | 12/1997 | Torre ............................ | 524/606 |
| 6,008,288 A * | 12/1999 | Dalla Torre .................... | 524/538 |
| 6,277,911 B1 * | 8/2001 | Torre ............................ | 524/606 |
| 2002/0128377 A1 * | 9/2002 | Torre et al. .................... | 524/600 |
| 2002/0179888 A1 * | 12/2002 | Montanari et al. .............. | 252/500 |
| 2003/0235666 A1 * | 12/2003 | Buhler .......................... | 428/35.7 |
| 2004/0158028 A1 * | 8/2004 | Buhler .......................... | 528/331 |
| 2005/0272908 A1 * | 12/2005 | Linemann et al. ............. | 528/310 |
| 2006/0030692 A1 * | 2/2006 | Montanari et al. ............. | 528/310 |
| 2007/0135586 A1 * | 6/2007 | Chakravarti et al. .......... | 525/419 |

FOREIGN PATENT DOCUMENTS

JP 2005-325362 11/2005

* cited by examiner

*Primary Examiner* — Michael Pepitone
(74) *Attorney, Agent, or Firm* — Marshall & Melhorn, LLC

(57) ABSTRACT

A transparent, amorphous polyamide molding compound contains polyamides which are formed by polycondensation of a linear aliphatic dicarboxylic acid with a cycloaliphatic diamine and also blends thereof, and also additives and/or colorants. The linear aliphatic dicarboxylic acid is selected from dicarboxylic acids with 17 to 21 C atoms and the diamine is bis(3-methyl-4-aminocyclohexyl)methane (MACM) and cross-linking additives, in the case of the additives, and photochromic colorants, in the case of the colorants, are precluded.

10 Claims, No Drawings though 20% below the known materials such as PMMA or polycarbonate. These advantageous properties, such as excellent processability, improved transparency, reduced clouding, improved chemical resistance, increased flexibility and reduced water absorption now permit applications in the field of correction lenses, non-correction lenses or sunglasses lenses, spectacle bows, spectacle frames, safety glasses, visors, protective helmets or eye protection of all types, and

TRANSPARENT, AMORPHOUS POLYAMIDE MOULDING COMPOUNDS AND USE THEREOF

CROSS-REFERENCE TO RELATED APPLICATIONS

This application is a continuation-in-part of application Ser. No. 11/732,537, filed Apr. 4, 2007, which is now abandoned.

The invention relates to transparent, amorphous polyamide moulding compounds which are characterised by excellent processability, high flexibility and low density. With the transparent, amorphous polyamide moulding compounds according to the invention, highly transparent moulded articles can be produced, which have in addition excellent mechanical properties, high chemical resistance, low weight and floatage in fresh water.

The transparent, amorphous polyamide moulding compounds according to the invention are obtained by polycondensation of aliphatic dicarboxylic acids with 17 to 21 C atoms and bis(3-methyl-4-amino-cyclohexyl)methane (MACM) as diamine component. The invention relates furthermore to the use of transparent, amorphous polyamide moulding compounds for the production of transparent moulded articles, in particular for the production of correction lenses, non-correction lenses or sun lenses for spectacles, spectacle bows, spectacle frames, safety glasses, visors, protective helmets or eye protection of all types, and also displays or housings.

Transparent, amorphous polyamide moulding compounds and transparent, amorphous polyamide moulded articles which can be produced therefrom are known in prior art. Fundamentally, two types of polymer are thereby differentiated in the field of transparent polyamides, and in fact firstly microcrystalline, transparent polyamides and also amorphous, transparent polyamides.

Microcrystalline, transparent polyamide moulding compounds and optical, transparent moulded articles which can be produced therefrom are known for example from DE 43 10 970 A1. The polyamides described there are produced from bis(4-amino-cyclohexyl)methane (PACM) as diamine component and linear dicarboxylic acids, e.g. dodecanedioic acid as acid component.

Amorphous, transparent polyamide moulding compounds are disclosed for example in EP 0 837 087 B1. From the above-mentioned European patent application, the production inter alia of transparent lenses made of bis(3-methyl-4-amino-cyclohexyl)methane (MACM) and dodecanedioic acid can be deduced.

In addition, transparent, amorphous polyamides which can be produced from MACM and a C14 dicarboxylic acid are described in EP 1 595 907 A1.

It has now been shown however that the previously known transparent polyamide moulding compounds have disadvantages. It has emerged in particular that the processability of the transparent, amorphous polyamide moulding compounds to form transparent moulded articles is not always satisfactory. In the production of moulded articles, it is in fact important that the polyamide moulding compound has as high a flowability as possible so that the granulate can hence be processed without difficulty into transparent moulded articles which have good properties. It is thereby essential that, even taking into account excellent processability, i.e. high flowability of the polyamide moulding compounds, the mechanical properties of the produced transparent moulded articles are nevertheless not impaired. It is essential for transparent moulded articles made of amorphous polyamides in addition that they have as high a transparency as possible. The previously known polyamide moulding compounds have not met these requirements entirely.

Starting herefrom, it is therefore the object of the present invention to indicate a transparent polyamide moulding compound with which transparent moulded articles can be produced, as high a flowability as possible of the polyamide moulding compound being required and, at the same time, the moulded article being intended to have excellent mechanical properties and as high a transparency as possible.

This object is achieved by the features of patent claim 1. The dependent sub-claims reveal advantageous developments.

According to the invention, a transparent, amorphous polyamide moulding compound is hence proposed which is composed of specifically selected educts, namely from bis(3-methyl-4-amino-cyclohexyl)methane (MACM) as diamine and aliphatic dicarboxylic acids with 17 to 21 C atoms.

The aliphatic dicarboxylic acids can thereby be produced technologically or biotechnologically.

It has now been shown that merely by selection of these specific components, transparent, amorphous polyamide moulding compounds are obtained which overall have properties which are significantly superior relative to the moulding compounds known in the state of the art.

The invention thereby also includes mixtures, i.e. blends, of the above-described polyamide moulding compounds according to the invention in any mixing ratios.

The excellent flowability which, determined in a spiral test, is significantly increased relative to those as known in prior art should be emphasised in particular. It should be stressed furthermore in the case of the amorphous polyamide moulding compounds according to the invention that, in addition to the excellent processability, the polyamide moulding compound has a light transmission of greater than 90%, preferably greater than 93% if the polyamide is present in the form of a plate, e.g. a round plate, with a thickness of 2 mm. Round plates of this type of 75×2 mm are produced on an injection moulding machine by the company Arburg, Model Allrounder 320-210-750 in a polished mould, the cylinder temperature being between 240 and 340° C. and the mould temperature between 20 and 140° C. The measurement of the light transmission is implemented with the measuring device Haze Gard plus by the company Byk Gardner in the CIE light type C on such round plates of the dimension 75×2 mm. The light transmission value is indicated in % of the incident radiated light quantity. It should be stressed furthermore that the flexibility, the chemical resistance, reduced clouding and also further properties of the transparent moulded articles of the invention are superior relative to moulded articles which were produced for example with a C12 dicarboxylic acid. Finally it should be indicated that the transparent moulded articles according to the invention also have a density of <0.990 g/cm$^3$.

This low density <1.0 endows the material with floatage in fresh water, as in salt water. As a result sports articles, spectacles, protective devices or objects of all types remain on the surface of water and are not lost. These densities are more than 20% below the known materials such as PMMA or polycarbonate. These advantageous properties, such as excellent processability, improved transparency, reduced clouding, improved chemical resistance, increased flexibility and reduced water absorption now permit applications in the field of correction lenses, non-correction lenses or sunglasses lenses, spectacle bows, spectacle frames, safety glasses, visors, protective helmets or eye protection of all types, and also displays or housings which are optionally coloured in immersion baths or treated with special coating compositions.

The high chemical resistance and toughness enables in addition use in conjunction with aggressive media, such as liquids or gases, such as for example in closures, in particular textile closures which are chemically cleaned. Similarly in gas masks, filter cups, throughflow meters, medical appliances, filter housings, discs, lamp housings, displays for mobile telephones or play consoles or GPS devices or other electronic devices or components, such as display screens or screen films.

Further applications are protective coverings for light wave guides, cable sheathing, light wave guides, transparent pipes and lines, e.g. for drinks and foodstuff transportation, also in drinks machines and applications in the packaging field, e.g. for mono- or multilayer films and containers.

As a result of the increased flexibility, the moulding compounds can be used above all in the automobile field, air travel and transportation or leisure means of all types, in particular wherever moulded articles are subjected to dynamic vibration stresses. Fashionable transparent mountings for snowboards, ski bindings, flippers, mountings and closures utilise these advantages. The low weight and the floatage in fresh water are of particular significance here.

As a result of the high flexibility, transparency and chemical resistance, in addition applications, such as for example display protective films for TFT screens or active advertising boards, are possible. The production can be effected with blown or flat film units or from pouring solutions.

The particular properties of the moulded articles which can be produced from the moulding compounds according to the invention enable in addition special processing techniques, such as milling, grinding, laser cutting and specific fixing techniques, such as screwing, gluing, welding. For example the resistance to mechanical crack formation in the case of a screwed connection in the moulded article increases with increasing C length of the dicarboxylic acid. The tendency to from stress cracks during treatment with aggressive chemicals is thereby reduced.

The transparent, amorphous polyamide moulding compounds according to the invention can of course, as already known per se in prior art, contain in addition additives, such as additives and colourants, whereas cross-linking additives, in the case of the additives, and photochromic colourants, in the case of the colourants, being precluded. Otherwise the supplements include for example stabilisers (heat and UV stabilisers of different types), flameretardants, antistatic agents, softeners, pigments, chain regulators, impact modifiers and/or fillers and reinforcing materials, in particular nonoscale fillers and reinforcing materials, such as e.g. minerals with a particle size of at most 100 nm or unmodified or modified phyllosilicates and can contain further additives. As heat stabilisers, for example IRANOX® 1098 or IRGANOX® 1010 can be used. As UV stabilisers, for example TINUVIN® 312 or 770 or NYLOSTAB® SEED can be used. A UV400 protection can be achieved for example with TINUVIN® 326 or 327. The stabilisers can be added directly or as a master batch with polyamide as carrier material. As optical brighteners, for example TINOPAL® DMSX or UNIVEX® OB can be used. As lubricants or inclusion reducers, for example VERSAPOL® can be used. These supplements are added to the polyamide moulding compounds in a manner known per se, e.g. in the polycondensation or thereafter in an extrusion.

From the point of view of materials, in the case of the transparent, amorphous polyamide moulding compounds according to the invention, in particular those with C18 dicarboxylic acid are preferred. The invention also includes however embodiments in which the dicarboxylic acid has been replaced by at most 50% by mol of an aromatic dicarboxylic acid. Examples of the aromatic dicarboxylic acids are isophthalic acid, terephthalic acid and naphthalenedicarboxylic acid and/or mixtures thereof. In addition to this, it is also possible to replace the diamine with at most 50% by mol bis(4-amino-cyclohexyl)methane (PACM). It is thereby essential that it concerns in all cases a transparent, amorphous polyamide.

The invention is explained subsequently in more detail with reference to a production example and Tables 1 and 2.

The production of the polyamides according to the invention for the polyamide moulding compounds according to the invention is effected in the manner known per se in known agitatable pressure autoclaves with a receiving vessel and a reaction vessel.

Deionised water is placed in the receiving vessel and the monomers and additives are added. Thereafter the solution is made inert multiple times with nitrogen. With agitation, heating takes place to 180° to 230° C. under the adjusting pressure in order to obtain a homogeneous solution. This solution is pumped through a sieve into the reaction vessel and is heated there to the desired reaction temperature of 270 to 310° C. at a pressure of at most 30 bar. The batch is maintained in the pressure phase for 2 to 4 hours at the reaction temperature. In the subsequent pressure release phase, the pressure is reduced to atmospheric pressure within 1 to 2 hours, the temperature being able to drop slightly.

In the following degassing phase, the batch is maintained at atmospheric pressure for 0.5 to 1 hours at a temperature of 270 to 340° C.

The polymer melt is discharged in strand form, cooled in the water bath at 15 to 80° C. and granulated. The granulate is dried for 12 hours at 80 to 120° C. under hydrogen to a water content of below 0.06% by weight.

The relative viscosity of the polyamides according to the invention for the polyamide moulding compounds according to the invention can, as known to the person skilled in the art, be adjusted by chemical and/or technological process measures. As a chemical measure, the use of a chain regulator is possible, it applying: if the quantity of the chain regulator is increased then the relative viscosity drops. Suitable chain regulators are monocarboxylic acids, such as benzoic acid, acetic acid, propionic acid or monoamines, such as stearylamine, but also dicarboxylic acids or diamines or regulators with amine or carboxylic acid groups which contain stabiliser groups of the HALS type or of the tertiary butyl phenol type, such as for example triacetone diamine or isophthalic acid-di-triacetone diamine derivatives. Regulators with a stabiliser group lead to improved light/UV or heat stability of the polyamide.

Preferred regulators for the polyamides according to the invention are benzoic acid, acetic acid or triacetone diamine. Chain regulators are used in concentrations of 20 to 100 mol per tonne end product, preferably 30 to 80 mol per tonne end product, even more preferred 40 to 50 mol per tonne end product.

Technological process methods include for example changing the duration of the pressure phase, the duration of the degassing phase, the cut-off torque or the temperature profile.

The relative viscosity (measured in 0.5% m-cresol solution at 20° C.) of the polyamides according to the invention is intended to be at least 1.45, preferably at least 1.55, even more preferred at least 1.65.

Suitable catalysts for accelerating the polycondensation reaction are phosphorus-containing acids, such as for example $H_3PO_2$, $H_3PO_3$, $H_3PO_4$, the salts or organic derivatives thereof which lead at the same time to a reduction in discoloration during processing. The catalysts are added in the range of 0.005 to 0.5% by weight, preferably 0.01 to 0.1% by weight.

Suitable defoamers for avoiding foam formation during degassing are aqueous 10% emulsions which contain silicones or silicone derivatives and are used in quantities of 0.01 to 1.0% by weight, preferably 0.01 to 0.10% by weight.

PRODUCTION EXAMPLE

The production of a polyamide moulding compound according to the invention is explained subsequently with reference to the composition used in example no. 4:

In the receiving flask of the 130 l pressure autoclave, 19.24 kg deionised water are placed and 39.81 kg octadecanedioic acid, 30.31 kg MACM, 0.10 kg benzoic acid and 15.5 g $H_3PO_2$ are added.

After deactivation 10 times, heating takes place to 230° C. and the homogeneous solution is pumped through a sieve into the reaction vessel.

With agitation, the batch is heated there to 295° C. and maintained for 4 hours at 20 bar in the pressure phase. Within 1.5 hours, pressure release to atmospheric pressure and degassing subsequently for 40 minutes take place.

The polymer melt is discharged, cooled in the water bath (65° C.) and granulated. The granulate is dried for 24 hours at 100° C. under nitrogen to a water content of below 0.06% by weight.

The measurements were implemented according to the following standards and on the following test bodies.

Spiral Flow Test:

On an injection moulding machine by the company Arburg, Model Allrounder 320-210-750, the flow spirals are produced at a material temperature of 280° C. and a moulding temperature of 100° C. with maximum injection pressure (approx. 1050 bar) and 1000 bar holding pressure.

The flow spiral has the dimensions width×thickness×maximum length: 10×1.5×1000 mm. The following distance marks are applied in the spiral:

dots at a spacing of 1 mm
lines at full centimeters
length data every 5 cm

Modulus of Elasticity in Tension:
ISO 527 with a tensile speed of 1 mm/min
ISO tensile bar, standard ISO/CD 3167, type A1, 170×20/10×4 mm, temperature 23° C.

Alternating Bending Strength:
ISO 178
ISO test bar, standard: ISO/CD 3167, type B1, 80×10×4 mm, temperature 23° C.
30-55 MPa deflection 3 mm
55-70 MPa deflection 4 mm The measurement of the alternating bending strength was implemented in the form of Wöhler curves on an appliance by the company Dyna Mess, CIMTronic 2000 according to ISO 178. The bending stress is repeated upwards and downwards with fixed deflection, this corresponds to a cycle. The number of cycles until breakage of the test body is indicated.

Ball-Pressure Hardness:
ISO 2039-1
ISO tensile bar, standard: ISO/CD 3167, type A1, 170×20/10×4 mm, temperature 23° C.

Density:
ISO 1183-3
Granulate
Temperature 23° C.

Stress-Crack Resistance:
DIN 53449
ISO tensile bar, standard: ISO/CD 3167, type A1, 170×20/10×4 mm, temperature 23° C.

The outer fibre strain (ofs) at which cracks are visible with the naked eye is indicated.

Transmission and Haze:
ASTM D 1003-61
Round plate, thickness 2 mm, radius 37.5 mm
Temperature 23° C.

Measuring device Haze Gard plus of the company Byk Gardner with CIE light type C. The light transmission and the haze value are indicated in % of the incident radiated light quantity.

Relative Viscosity:
DIN 53727, in 0.5% by weight m-cresol solution
Temperature 20° C.

All the test bodies are used in the dry state. For this purpose, the test bodies are stored at room temperature in a dry environment for at least 48 h after injection moulding.

In Table 1, the monomers used in the examples are characterised.

TABLE 1

| Monomer | Commercial Product | Number of C atoms | Melting point [° C.] | Manufacturer |
|---|---|---|---|---|
| MACM | Laromin C260 | — | −7 to −1 | BASF AG |
| Dodecanedioic acid | Dodecanedioic acid | 12 | 130 | Du Pont |
| Tridecanedioic acid | DC13 | 13 | 115-116 | Cathay Biotechnology Ltd. |
| Tetradecanedioic acid | DC14 | 14 | 126-127 | Cathay Biotechnology Ltd. |
| Octadecanedioic acid | DC18 | 18 | 129 | Cognis |

In Table 2, the properties of a transparent, amorphous polyamide moulding compound according to the invention, which was produced with a C18 diacid and MACM as diamine (example no. 4), are compared with the properties of corresponding polyamide moulding compounds which likewise were produced with MACM as diamine component but with C12 to C14 diacid (examples 1 to 3).

TABLE 2

| Examples | | | Number | | | |
|---|---|---|---|---|---|---|
| | Condition | Unit | 1 | 2 | 3 | 4 |
| Components | | | | | | |
| MACM* | — | % by mol | 50 | 50 | 50 | 50 |
| Dodecanedioic acid | — | % by mol | 50 | — | — | — |
| Tridecanedioic acid | — | % by mol | — | 50 | — | — |
| Tetradecanedioic acid | — | % by mol | — | — | 50 | — |
| Octadecanedioic acid | — | % by mol | — | — | — | 50 |
| Tests | | | | | | |
| Spiral flow test | ** | mm | 215 | 210 | 205 | 250 |
| Modulus of elasticity in tension | Dry | MPa | 1460 | 1370 | 1340 | 1160 |
| Alternating bending test | 30-55 MPa | Cycles | 230 000 | 260 000 | 400 000 | 650 000 |
| | 56-70 MPa | Cycles | 50 000 | 45 000 | 50 000 | 80 000 |
| Ball-pressure hardness | Dry, 23° C. | MPa | 100 | 96 | 92 | 80 |
| Density | 23° C. | g/ccm | 1.006 | 1.000 | 0.995 | 0.979 |
| Stress-crack resistance | acetone | ofs*** in % | 1 | 1 | 1 | 3 |
| | isopropanol | ofs*** in % | 1.25 | 1.25 | 1.25 | 4 |
| Light transmission | 75 × 2 mm | % | 92.7 | 93.0 | 93.3 | 93.3 |
| Haze | 75 × 2 mm | % | 0.70 | 0.65 | 0.59 | 0.53 |
| Relative viscosity | 0.5% by weight m-cresol 20° C. | — | 1.77 | 1.78 | 1.80 | 1.80 |

*Bis(3-methyl-4-amino-cyclohexyl)methane
** Material temperature 280° C., moulding temperature 100° C.
***Outer fibre strain The flowability in the spiral flow test of the polyamide moulding compounds according to the invention is accordingly at 250 mm significantly better than in the state of the art with 205 to 215 mm. Properties improved in this way with respect to the flow behaviour were in no way predictable for a person skilled in the art.

The improved flexibility of the polyamide moulding compound according to the invention is revealed in the reduced modulus of elasticity in tension and in the reduced ball-pressure hardness, and also in the greatly increased alternating bending resistance of the moulded articles produced therefrom.

The moulded articles produced with the polyamide moulding compounds according to the invention have a density which is below 0.980 g/cm³ so that as a result new application possibilities are produced which demand for example floatage in fresh water. Low densities in land vehicles, water craft or aircraft and spacecraft are furthermore of great significance.

The improved chemical resistance of a moulded article which has been produced with a polyamide moulding compound according to the invention is revealed in its very good stress-crack resistance in acetone and isopropanol.

The optical properties, light transmission and haze are likewise significantly improved in the case of the moulded bodies made of a polyamide moulding compound according to the invention, the light transmission being above 93% and the haze below 0.55%. Hence optical values can be achieved which are in the range of the best transparent plastic material PMMA and significantly above polycarbonate and polystyrene.

In a preferred embodiment of the present invention, transparent, amorphous polyamide moulding compounds, containing polyamides are formed by polycondensation of a linear aliphatic dicarboxylic acid with a cycloaliphatic diamine and also blends thereof, and also additives and/or colourants. The linear aliphatic dicarboxylic acid is selected from dicarboxylic acids with 17 to 21 C atoms and the diamine is bis(3-methyl-4-aminocyclohexyl)methane (MACM) and cross-linking additives, in the case of the additives, and photochromic colourants, in the case of the colourants, are precluded.

In another preferred embodiment of the present invention, the density of the transparent amorphous polyamide moulding compositions is <1.00 g/cm³.

In another preferred embodiment of the present invention, 100% by mol of the linear dicarboxylic acid has been replaced by at most 50% by mol of an aromatic dicarboxylic acid.

In another preferred embodiment of the present invention, the aromatic dicarboxylic acid is selected from the group consisting of: isophthalic acid, terephthalic acid and naphthalenedicarboxylic acid and mixtures thereof.

In another preferred embodiment of the present invention, 100% by mol of the diamine has been replaced by at most 50% by mol bis(aminocyclohexyl) methane.

In another preferred embodiment of the present invention, the amorphous polyamide moulding compounds further comprise additives.

In another preferred embodiment of the present invention, the additives are selected from the group consisting of: fillers, heat stabilisers, UV stabilisers, softeners, flameproofing agents, pigments, colourants, impact modifiers and/or end group regulating compounds.

In a preferred method for utilizing the transparent, amorphous polyamide moulding compounds of the present invention for the production of transparent moulded articles, the transparent amorphous polyamide moulding compound is formed into the article desired.

In another preferred embodiment of the present invention the transparent, amorphous polyamide moulding compounds according to claim 1 for the production of objects which float in fresh water as in salt water and do not sink, the transparent amorphous polyamide moulding compounds are formed into the article desired.

In another preferred embodiment of the present invention, the formed article comprises one of: correction lenses, non-correction lenses or sunglasses lenses, spectacle bows, spectacle frames, safety glasses, visors, protective helmets or eye protection of all types and also magnifying glasses, lens systems, microscopes, cameras, displays, camera lenses, measuring instruments, watch glass or housings, portable telephones with or without integrated displays or apparatus of any type and for CDs, DVDs, lenses for LEDs, light wave guides, light couplers, light amplifiers, light distributors and discs for lamps and laser appliances, films or containers.

The invention claimed is:

1. A transparent, amorphous polyamide moulding compounds, containing polyamides formed by polycondensation of a linear aliphatic dicarboxylic acid with a cycloaliphatic diamine and also blends thereof, and also additives and/or colourants, wherein the linear aliphatic dicarboxylic acid is a dicarboxylic acid with 18 C atoms and the diamine is bis(3-methyl-4-aminocyclohexyl)methane (MACM) and cross-linking additives, in the case of the additives, and photochromic colourants, in the case of the colourants, are precluded, wherein 100% by mol of the linear dicarboxylic acid can be replaced by at most 50% by mol of an aromatic dicarboxylic acid.

2. The transparent, amorphous polyamide moulding compounds according to claim 1, wherein the moulding has a density <1.00 g/cm$^3$.

3. The transparent, amorphous polyamide moulding compounds according to claim 1, wherein the aromatic dicarboxylic acid is selected from the group consisting of: isophthalic acid, terephthalic acid and naphthalenedicarboxylic acid.

4. The transparent, amorphous polyamide moulding compounds according to claim 1, wherein 100% by mol of the diamine has been replaced by at most 50% by mol bis(aminocyclohexyl)methane.

5. The transparent, amorphous polyamide moulding compounds according to claim 1, further comprising additives.

6. The transparent, amorphous polyamide moulding compounds according to claim 5, wherein the additives are selected from the group consisting of: fillers, heat stabilisers, UV stabilisers, softeners, flameproofing agents, pigments, colourants, impact modifiers and end group regulating compounds.

7. A method of utilizing the transparent, amorphous polyamide moulding compounds according to claim 1, for the production of transparent moulded articles comprising forming the transparent amorphous polyamide moulding compound into the article desired.

8. A method of utilizing the transparent, amorphous polyamide moulding compounds according to claim 1 for the production of objects which float in fresh water as in salt water and do not sink, comprising forming the transparent amorphous polyamide moulding compound into a desired article.

9. The method according to claim 7, wherein the article comprises one of correction lenses, non-correction lenses or sunglasses lenses, spectacle bows, spectacle frames, safety glasses, visors, protective helmets or eye protection of all types and also magnifying glasses, lens systems, microscopes, cameras, displays, camera lenses, measuring instruments, watch glass or housings, portable telephones with or without integrated displays or apparatus of any type and for CDs, DVDs, lenses for LEDs, light wave guides, light couplers, light amplifiers, light distributors and discs for lamps and laser appliances, films or containers.

10. The transparent, amorphous polyamide moulding compounds according to claim 1, containing an MACM 18 polyamide.

\* \* \* \* \*